United States Patent
Chen

(10) Patent No.: US 11,604,306 B2
(45) Date of Patent: Mar. 14, 2023

(54) ANTI-PEEPING FILM AND METHOD FOR MANUFACTURING SAME, AND BACKLIGHT MODULE AND DISPLAY APPARATUS

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventor: Jialuo Chen, Beijing (CN)

(73) Assignees: BOE OPTICAL SCIENCE AND TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 362 days.

(21) Appl. No.: 16/757,311

(22) PCT Filed: Mar. 21, 2019

(86) PCT No.: PCT/CN2019/079079
§ 371 (c)(1),
(2) Date: Apr. 17, 2020

(87) PCT Pub. No.: WO2019/196624
PCT Pub. Date: Oct. 17, 2019

(65) Prior Publication Data
US 2021/0405266 A1 Dec. 30, 2021

(30) Foreign Application Priority Data
Apr. 12, 2018 (CN) .......................... 201810327381.2

(51) Int. Cl.
*G02B 3/00* (2006.01)
*G02B 1/04* (2006.01)
(Continued)

(52) U.S. Cl.
CPC ........... *G02B 3/0037* (2013.01); *G02B 1/041* (2013.01); *G02B 3/0012* (2013.01); *G02B 5/005* (2013.01); *G02B 6/0051* (2013.01); *G02B 6/0055* (2013.01)

(58) Field of Classification Search
CPC .... G02B 3/0037; G02B 1/041; G02B 3/0012; G02B 6/0053; G02B 2207/123; G02B 3/0056
See application file for complete search history.

(56) References Cited

U.S. PATENT DOCUMENTS 8,705,175 B1    4/2014 Lundgren et al.
2001/0019378 A1* 9/2001 Yamaguchi .......... G02B 3/0031
                                                        349/61
(Continued)

FOREIGN PATENT DOCUMENTS

CN    202947082 U    5/2013
CN    104880760 A    9/2015
(Continued)

*Primary Examiner* — Alicia M Harrington

(57) ABSTRACT

A privacy protection film, a manufacturing method thereof, a backlight module, and a display device are provided. The privacy protection film includes a substrate, a light incident surface of the substrate is provided with a reflective layer, light transmission holes are provided on the reflective layer; a light exiting surface of the substrate is provided with a micro-lens array; each of the light transmission holes corresponds to at least one micro-lens in the micro-lens array; and the micro-lens is configured to control an exiting direction of light exiting from the light exiting surface of the substrate to remain unchanged; or, the micro-lens is configured to control an exiting direction of the light exiting from the light exiting surface of the substrate to be deflected toward a direction of an axis of the micro-lens.

17 Claims, 5 Drawing Sheets

(51) Int. Cl.
    *G02B 5/00*       (2006.01)
    *F21V 8/00*       (2006.01)

(56)     References Cited

U.S. PATENT DOCUMENTS

2006/0061869 A1*  3/2006  Fadel ................ G02F 1/133526
                                                                      359/619
2007/0087186 A1   4/2007  Clarke et al.
2014/0204464 A1*  7/2014  Halverson ......... G02F 1/133524
                                                                      359/599

FOREIGN PATENT DOCUMENTS

| CN | 105383098 A | 3/2016 | |
|----|-------------|--------|---|
| CN | 105667043 A | 6/2016 | |
| CN | 106019430 A | 10/2016 | |
| CN | 107065307 A * | 8/2017 | ......... G02B 19/0028 |
| CN | 107346075 A | 11/2017 | |
| CN | 108508509 A | 9/2018 | |

* cited by examiner

ANTI-PEEPING FILM AND METHOD FOR MANUFACTURING SAME, AND BACKLIGHT MODULE AND DISPLAY APPARATUS

CROSS REFERENCE TO RELATED APPLICATIONS

The present application claims priority to Chinese patent application No. 201810327381.2 entitled "A PRIVACY PROTECTION FILM, MANUFACTURING METHOD THEREOF, BACKLIGHT MODULE, AND DISPLAY DEVICE" and filed with CNIPA on Apr. 12, 2018, the disclosure of which is incorporated herein by reference in its entirety.

TECHNICAL FIELD

Embodiments of the present disclosure relate to a privacy protection film, a manufacturing method thereof, a backlight module, and a display device.

BACKGROUND

A privacy protection film has a limited visible area, so that when a display device employing a privacy protection film is displaying, information being displayed on the display screen of the display device can be only read by a user from the front side, and cannot be seen by other people on a lateral side of the user. That is, others can only see a dark screen, which effectively protects the user's confidentiality and/or personal privacy.

SUMMARY

Embodiments of the present disclosure provide a privacy protection film, a manufacturing method thereof, a backlight module, and a display device.

At least one embodiment provides a privacy protection film, comprising, a substrate. A light incident surface of the substrate is provided with a reflective layer; light transmission holes are provided on the reflective layer; a light exiting surface of the substrate is provided with a micro-lens array; each of the light transmission holes corresponds to at least one micro-lens in the micro-lens array; and each micro-lens is configured to control an exiting direction of light exiting from the light exiting surface of the substrate to remain unchanged; or, each micro-lens is configured to control an exiting direction of the light exiting from the light exiting surface of the substrate to be deflected toward a direction of an axis of the micro-lens.

For example, in the micro-lens array, a distance p between axes of two adjacent micro-lenses satisfies $$p \geq 2t(n^2 - 1)^{\frac{1}{2}},$$

where n is a refractive index of the substrate, and t is a thickness of the substrate.

For example, a convexity correlation factor k of the micro-lens satisfies $$k = \frac{h}{(t/\cos\theta)} \text{ and } 1 \leq k \leq 1 + \frac{1}{n},$$

where $\theta$ is a total reflection angle of the substrate and $$\theta = \arcsin\left(\frac{1}{n}\right),$$

h is a distance from a vertex of the micro-lens to the reflective layer; and a viewing angle of the privacy protection film is inversely proportional to the convex correlation factor k of the micro-lens.

For example, the light transmission holes comprise circular holes or polygonal holes; a distance p' between centers of two adjacent light transmission holes is equal to a distance p between axes of two adjacent micro-lenses; and the axes of the micro-lenses are perpendicular to the light incident surface of the substrate and pass through the corresponding centers of the light transmission holes.

For example, a viewing angle correlation factor A of the privacy protection film satisfies $$A = \frac{d}{p'},$$

where d is a diameter of each light transmission hole; and the viewing angle of the privacy protection film is proportional to the viewing angle correlation factor A.

For example, the micro-lens array has a shape of a hexagon, a square, or a rectangle; and each micro-lens has a shape of a spherical corona or an ellipsoidal corona.

For example, a material of the substrate comprises polyethylene terephthalate or polycarbonate; a material of the micro-lens is the same as that of the substrate; or, a material of the micro-lens comprises an ultraviolet curing adhesive or a photoresist.

At least one embodiment also provides a method of manufacturing the privacy protection film, comprising: providing a substrate; forming a reflective layer on the light incident surface of the substrate, and forming light transmission holes on the reflective layer; forming a micro-lens array on the light exiting surface of the substrate, so that each of the light transmission holes corresponds to at least one micro-lens in the micro-lens array. Each micro-lens is configured to control the exiting direction of the light exiting from the light exiting surface of the substrate to remain unchanged; or, each micro-lens is configured to control the exiting direction of the light exiting from the light exiting surface of the substrate to be deflected toward the direction of the axis of the micro-lens.

At least one embodiment also provides a backlight module, comprising the privacy protection film.

At least one embodiment also provides a display device, comprising the backlight module.

BRIEF DESCRIPTION OF THE DRAWINGS

Embodiments of the present disclosure will be described in more detail below with reference to accompanying drawings, so that those skilled in the art can more clearly understand the embodiments of the present disclosure, in which.

DETAILED DESCRIPTION

Figure 1:
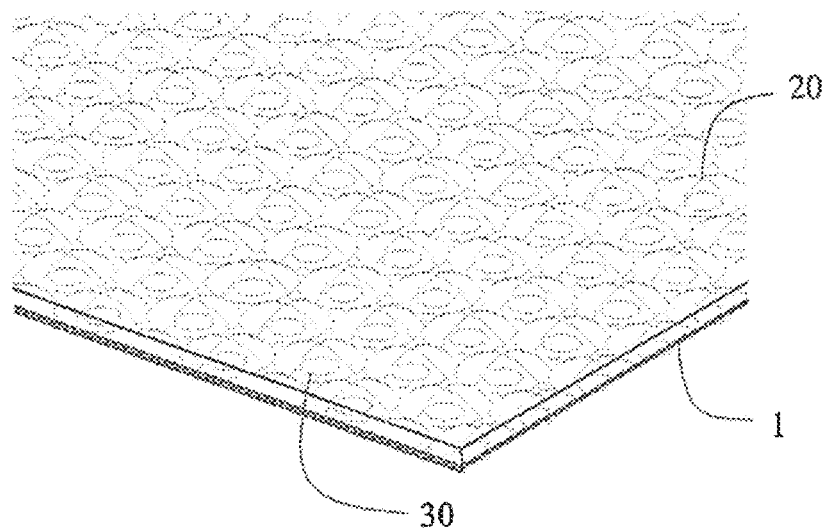
FIG. 1 is a schematically perspective structural diagram illustrating a privacy protection film according to an embodiment of the present disclosure.

Technical solutions of the embodiments will be described in a clearly and fully understandable way in connection with the drawings related to the embodiments of the disclosure. It is apparent that the described embodiments are a part but not all of the embodiments of the disclosure. Based on the described embodiments herein, one of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as 'first,' 'second,' or the like, which are used in the description and the claims of the present disclosure, are not intended to indicate any sequence, amount or importance, but for distinguishing various components. The terms, such as 'comprise/comprising,' 'include/including,' or the like are intended to specify that the elements or the objects stated before these terms encompass the elements or the objects and equivalents thereof listed after these terms, but not preclude other elements or objects. The terms, 'on,' 'under,' or the like are only used to indicate relative position relationship, and when the absolute position of the object which is described is changed, the relative position relationship may be changed accordingly.

In a privacy protection film of an ultra-fine louver structure, a plurality of first resin strips are disposed in parallel on a substrate and a second resin strip is disposed between every two adjacent first resin strips, wherein the first resin strips act as a transmission unit, the second resin strips act as an absorbing unit, and the first resin strips have a different refractive index from that of the second resin strips.

However, the inventors have discovered that although the second resin strips in the privacy protection film can act as an absorption unit to absorb light entering therein and block part of the lights passing through the privacy protection film, so as to limit the visible area of the privacy protection film and realize the privacy protection function, the second resin strips absorbing lights can also tend to cause an excessively low light transmittance of the privacy protection film, reduce the intensity of the light exiting from the backlight module where the privacy protection film is disposed, and have adverse effect on the display effect of the display device where the privacy protection film is disposed. Moreover, the second resin strips and the first resin strips are alternately disposed in parallel so that the privacy protection film can only protect privacy in a plane perpendicular to the running direction of the resin strips, which means that the privacy protection film can protect privacy only in one plane, and it is impossible to realize privacy protection in all directions.

In order to further explain the privacy protection film and the manufacturing method, the backlight module, and the display device according to embodiments of the present disclosure, detailed description is given below with reference to the accompanying drawings.

Referring to FIG. 1 to FIG. 3(b), a privacy protection film according to an embodiment of the present disclosure includes a substrate 1, a light incident surface of the substrate 1 is provided with a reflective layer 3, light transmission holes 30 are provided on the reflective layer 3; a light exiting surface of the substrate 1 is provided with a micro-lens array; each light transmission hole 30 corresponds to at least one micro-lens 20 in the micro-lens array; each micro-lens 20 is configured to control an exiting direction of light exiting from the light exiting surface of the substrate 1 to remain unchanged; or, each micro-lens 20 is configured to control the exiting direction of the light exiting from the light exiting surface of the substrate 1 to be deflected toward a direction of an axis of the micro-lens 20.

The substrate 1 is a transparent substrate, and uses a light transmitting resin material, for example, polyethylene terephthalate (PET), or polycarbonate (PC), or the like, and can has a thickness t about 10 μm to about 200 μm. The light incident surface of the substrate 1 refers to a surface of the substrate 1 facing a backlight source, that is, a surface of the substrate 1 where light exiting from the backlight source enters the substrate 1. The light exiting surface of the substrate 1 refers to a surface of the substrate 1 facing away from the backlight source, that is, a surface of the substrate 1 where light exiting from the backlight source exits from the substrate 1 after passing through the substrate 1.

Figure 3A:
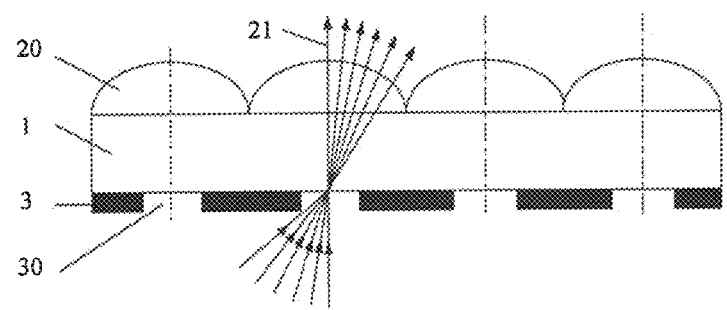
FIG. 3(a) and FIG. 3(b) are schematic diagrams illustrating optical signal propagation of light exiting from a light transmission hole respectively in two different exiting directions according to an embodiment of the present disclosure.
Figure 3B:
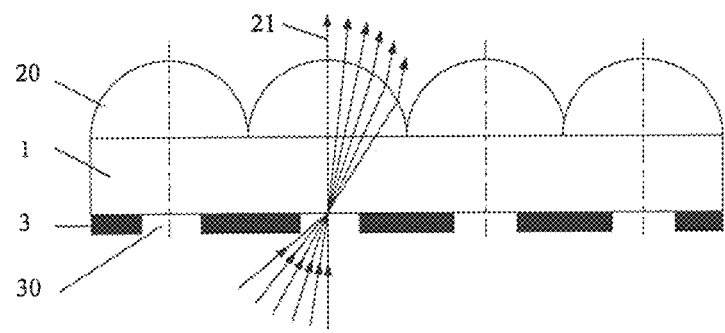

When the privacy protection film according to the above embodiment is used in conjunction with a backlight source, the light exiting from the backlight source illuminates the reflective layer 3 of the privacy protection film. The light beams exiting from the backlight source are in a Lambertian distribution. After the light beams exiting from the backlight source enter the substrate 1 through the light transmission holes 30 of the layer 3, under the refraction of the substrate 1, the light beams exiting from the backlight source will be concentrated to a small three-dimensional cone angle in a corresponding area inside the substrate 1, and exit from the light exiting surface of the substrate 1 at the three-dimensional cone angle. Then, for the light beams exiting from the light exiting surface of the substrate 1, each micro-lenses 20 provided on the light exiting surface of the substrate 1 is configured to control the light path, so that the light exiting direction of each light beam exiting from the light exiting surface of the substrate 1 remains unchanged, as shown in FIG. 3(a), or, the light exiting direction from the light exiting surface of the substrate 1 is deflected toward the direction of the axis of the corresponding micro-lens 20, as shown in FIG. 3(b). It can enable the light beams exiting from the backlight source to exit at the three-dimensional cone angle after passing through the privacy protection film and to keep a relatively small exiting angle, to effectively limit the viewing angle of the display device where the privacy protection film is disposed, so as to achieve privacy protection of the display device in all directions. That is, the privacy protection function of the display device is not limited to one plane, and except for the user who is directly opposite the display device, other people around the user cannot see the display content of the display device.

In addition, the privacy protection film according to this embodiment can use the reflective layer 3 provided on the light incident surface of the substrate 1 to reflect light beams of the backlight source which do not enter the light transmission holes 30, back to the interior of the backlight source, so that this part of light beams can be emitted to the light transmission holes 30 again after being scattered, refracted, or reflected by other optical components in the backlight module. This can not only improve the utilization rate of the lights emitted by the backlight source, but also can improve the intensity of the light exiting from the backlight module where the privacy protection film is disposed, to realize high-brightness display of the display device.

It can be understood that the axis of each micro-lens 20 generally refers to the optical axis 21 of the micro-lens 20. To permit the light exiting from the light exiting surface of the substrate 1 to keep the exiting direction unchanged or have its exiting direction deflected toward the direction of the axis of each micro-lens 20 after passing through the micro-lens 20, the micro-lenses 20 should have a same refractive index as that of the substrate 1. Therefore, the micro-lens 20 can be made of a same material as that of the substrate 1, or can be made of an ultraviolet curing adhesive or a photoresist material, similar to that of the material of the substrate. In addition, the micro-lens array can have a shape of a hexagon, a square, or a rectangle, and each of the micro-lenses 20 in the micro-lens array can be a curved shape, such as a spherical corona, or an ellipsoidal corona, but the embodiments of the present disclosure are not limited thereto.

The count of the light transmission holes 30 can be designed according to requirements; and the shape of each light transmission hole 30 can be circular, or polygonal, for example, a geometrically symmetrical shape. In this embodiment, an array of light transmission holes is provided on the reflective layer 3, and the array of light transmission holes can have a shape match that of the micro-lens array.

Figure 2:
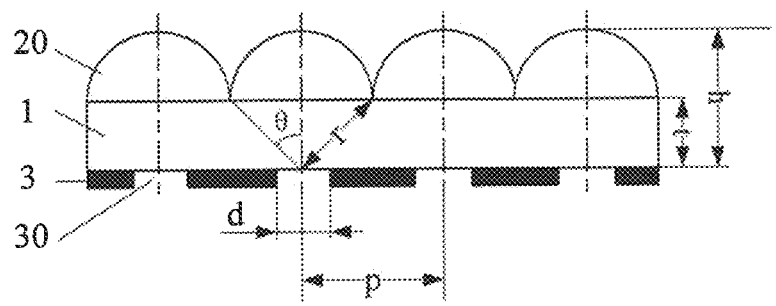
FIG. 2 is a schematically cross-sectional structure diagram illustrating a privacy protection film according to an embodiment of the present disclosure.

To more clearly illustrate the structure of the privacy protection film and the privacy protection effect thereof in this embodiment, for example, referring to FIG. 2, when a distance p between centers of two adjacent light transmission holes 30 is equal to a distance p between axes of two adjacent micro-lenses 20, that is, the light transmission holes 30 correspond to the micro-lenses 20 one to one, the axis of each micro-lens 20 is perpendicular to the light incident surface of the substrate 1 and passes through the center of the corresponding light transmission hole 30. The light transmission hole 30 has a diameter d, and a viewing angle correlation factor A of the privacy protection film satisfies $$A = \frac{d}{p'}.$$

Figure 5A:
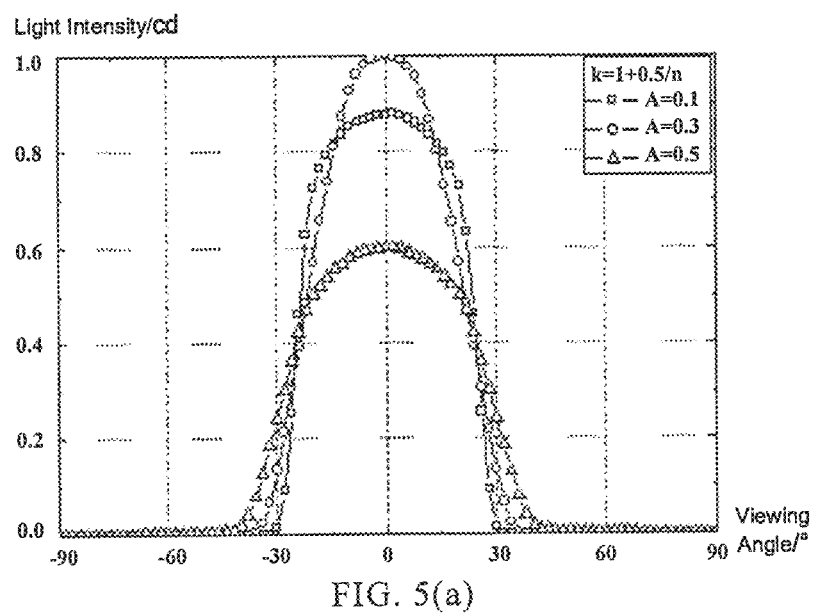
FIG. 5(a) is a graph illustrating light intensity effect of a privacy protection film under different viewing angle correlation factors A according to an embodiment of the present disclosure.

The viewing angle of the privacy protection film is proportional to the viewing angle correlation factor A; that is, the smaller the viewing angle correlation factor A is, the narrower the distribution of the light intensity exiting from the privacy protection film through the light transmission holes 30 is. The smaller the viewing angle of the privacy protection film is, the better the privacy protection effect of the privacy protection film is. FIG. 5(a) can be referred for details of a graph of light intensity effect of a privacy protection film under different values of A.

Continuously referring to FIG. 2, when the refractive index of the substrate 1 is n, and the thickness of the substrate 1 is t, the distance p between axes of two adjacent micro-lenses 20 in the micro-lens array can be obtained according to a formula $$p \geq 2t(n^2 - 1)^{\frac{1}{2}}.$$

The total reflection angle of the substrate 1 is related to its refractive index n, and when the total reflection angle of the substrate 1 is θ

$$\theta = \arcsin\left(\frac{1}{n}\right).$$

Figure 5B:
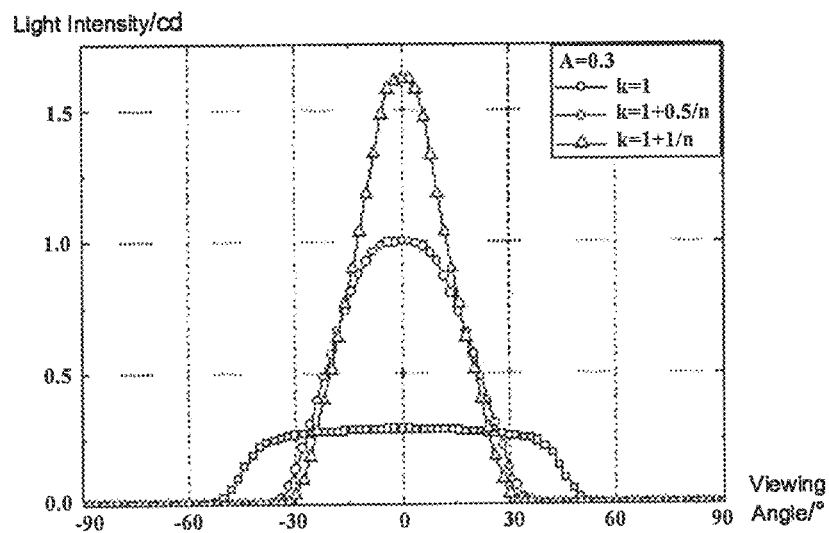
FIG. 5(b) is a graph illustrating light intensity effect of a privacy protection film under different convexity correlation factors k according to an embodiment of the disclosure.

A distance from the apex of each micro-lens 20 to the reflective layer 3 is h. A convexity correlation factor k of the micro-lens 20 can be obtained according to a formula:

$$k = \frac{h}{(t/\cos\theta)} = \frac{h}{r},$$

and the value of the convexity correlation factor k satisfies $$1 \leq k \leq 1 + \frac{1}{n};$$

where when k=1, the light beams exiting from the light exiting surface of the substrate 1 can keep the exiting directions unchanged under the control of the micro-lens 20; and when $$k = 1 + \frac{1}{n},$$

the light beams exiting from the light exiting surface of the substrate 1 can be deflected toward the direction of the axis of each micro-lens 20 under the control of the micro-lens 20; r=t/cos θ, where r is a critical dimension that the light beams entering the substrate 1 from the light transmission hole 30 can exit from the light exiting surface of the substrate 1. The viewing angle of the privacy protection film is inversely proportional to the convexity correlation factor k of each micro-lens 20, that is, the larger the value of the convexity correlation factor k of the micro-lens 20 is, the more convex the micro-lens 20 is, so that the narrower the distribution of the light intensity exiting from the micro-lens 20 is, the smaller the viewing angle of the privacy protection film is, and the better the privacy protection effect of the privacy protection film is. FIG. 5(b) can be referred for details of a graph of light intensity effect of a privacy protection film under different values of k.

It is to be additionally noted that although the viewing angle of the privacy protection film can decrease as the value of the viewing angle correlation factor A decreases, a decrease in the value of the viewing angle correlation factor A will also cause a decrease in the intensities of lights exiting from the privacy protection film. In this way, the structural design of the privacy protection film needs to consider the values of the viewing angle correlation factor A and the convexity correlation factor k of the micro-lenses 20 in order to ensure or improve the light intensity of the backlight module while achieving better privacy protection performance.

Figure 4A:
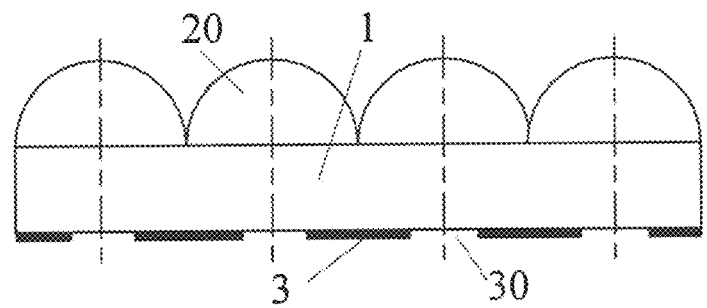
FIG. 4(a), FIG. 4(b), and FIG. 4(c) are schematic diagrams illustrating three different structures of a reflective layer in a privacy protection film according to an embodiment of the present disclosure.
Figure 4B:
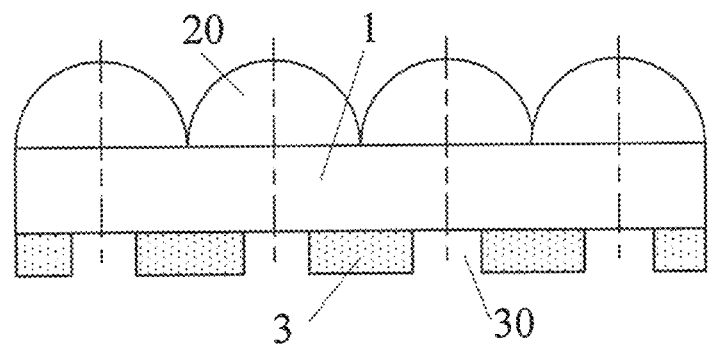
Figure 4C:
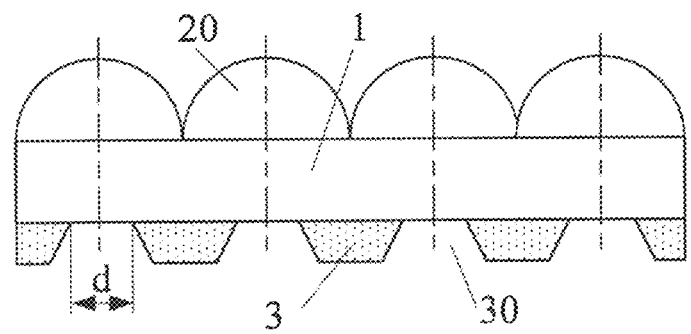

It is to be noted that, in the above embodiment, the reflective layer 3 can adopt a film structure having a high reflectance, such as a silver coating layer, an aluminum coating layer, or a silver-aluminum composite layer. The thickness of the reflective layer 3 can be designed independently as required, such as a thin film shown in FIG. 4(*a*), or a reflective film with a thickness of 20 μm to 200 μm as shown in FIGS. 4(*b*) and 4(*c*). As an example, the reflective layer 3 is a reflective film material with a certain thickness, and the light transmission hole 30 provided on the reflective layer 3 is a cylindrical hole with constant radial dimensions or a circular truncated cone hole with a gradually changing radial dimension.

In the privacy protection film according to the above embodiment, when the light beams exiting from the backlight source illuminate the reflective layer of the privacy protection film, the light beams exiting from the backlight source are in a Lambertian distribution. After light exiting from the backlight source enters the substrate through a light transmission hole of the layer, under the refraction of the substrate, the light beams exiting from the backlight source will be concentrated to a small three-dimensional cone angle in a corresponding area inside the substrate, and exit from the light exiting surface of the substrate at the three-dimensional cone angle. Then, for the light beams exiting from the light exiting surface of the substrate, the micro-lenses provided on the light exiting surface of the substrate are configured to control the light paths, so that the light exiting directions of the light beams exiting from the light exiting surface of the substrate remain unchanged, or, the light exiting directions from the light exiting surface of the substrate are deflected toward the direction of the axis of the corresponding micro-lens. It can allow the light beams exiting from the backlight source exit at the three-dimensional cone angle after passing through the privacy protection film and keep relatively small exiting angles, to effectively limit the viewing angle of the display device where the privacy protection film is disposed, so as to achieve privacy protection of the display device in all directions.

Moreover, the privacy protection film according to the embodiment of the present disclosure can use the reflective layer provided on the light incident surface of the substrate to reflect light beams of the backlight source which do not enter the light transmission holes, back to the interior of the backlight source, so that this part of light beams can be emitted to the light transmission holes again after being scattered, refracted, or reflected by other optical components in the backlight module. In this way, the utilization rate of the lights emitted by the backlight source is improved, and the intensity of the light exiting from the backlight module where the privacy protection film is disposed is also improved, so that a high-brightness display of the display device is realized.

Figure 8:
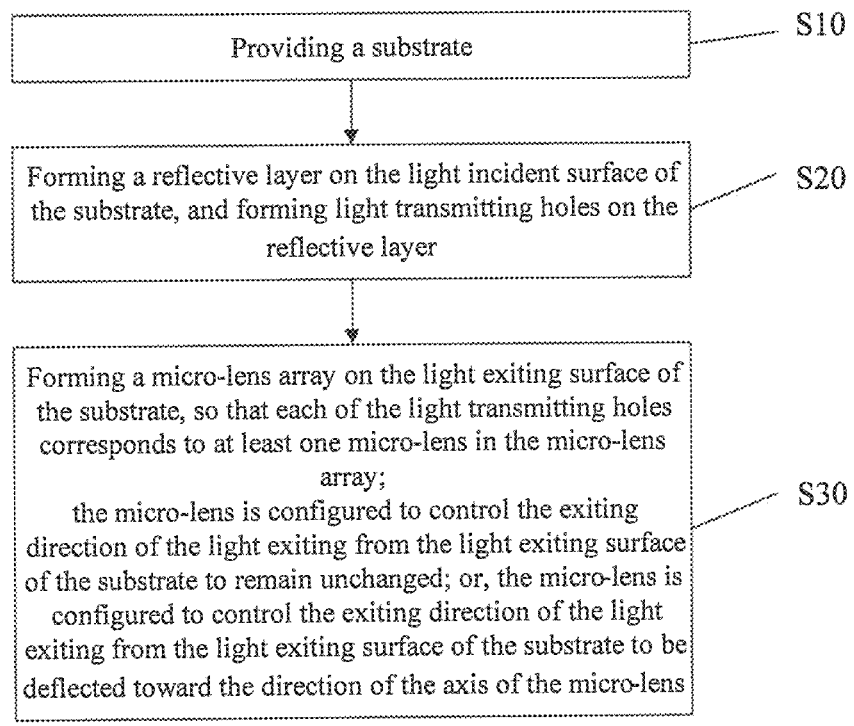
FIG. 8 is a flowchart illustrating a method for manufacturing a privacy protection film according to an embodiment of the present disclosure.

An embodiment of the present disclosure also provides a method of manufacturing a privacy protection film, which is used to manufacture the privacy protection film according to the above embodiment. As shown in FIG. 8, the manufacturing method includes the following operations.

S10, a substrate is provided.

As an example, a light transmissive resin material, such as polyethylene terephthalate (PET), or polycarbonate (PC), is used to form a substrate with a thickness of 10 μm to 200 μm.

S20, a reflective layer is formed on the light incident surface of the substrate, and light transmission holes are formed on the reflective layer.

The light incident surface of the substrate refers to a surface of the substrate facing the backlight source, that is, a surface from which the light exiting from the backlight source enters the substrate. The light incident surface of the substrate can be made of a material with a high reflectivity, such as silver, or aluminum, to form a reflective layer. When the light transmission holes are formed in the reflective layer, the count of the light transmission holes can be designed as required. The shape of the light transmission hole can be circular or polygonal, for example, a geometrically symmetrical shape. In this embodiment, an array of light transmission holes is provided on the reflective layer. The shape of the array of light transmission holes can be hexagonal, square, or rectangular, but the embodiments of the present disclosure are not limited thereto.

S30, a micro-lens array is formed on the light exiting surface of the substrate, so that each light transmission hole corresponds to at least one micro-lens in the micro-lens array; each micro-lens is configured to control the exiting direction of the light exiting from the light exiting surface of the substrate to remain unchanged; or, each micro-lens is configured to control the exiting direction of the light exiting from the light exiting surface of the substrate to be deflected toward the direction of the axis of the micro-lens.

The light exiting surface of the substrate refers to a surface of the substrate facing away from the backlight source, that is, a surface of the substrate where the light exiting from the backlight source exits the substrate after passing through the substrate. The micro-lens array can have a shape of a hexagon, a square, or a rectangle, and each micro-lens in the micro-lens array can be a curved shape, such as a spherical corona, or an ellipsoidal corona, but the embodiments of the present disclosure are not limited thereto.

The axis of each micro-lens refers to the optical axis of the micro-lens. In order to enable the light exiting from the light exiting surface of the substrate to keep the exiting direction unchanged or have its exiting direction deflected toward the direction of the axis of the micro-lens after passing through the micro-lens, the micro-lenses have a same refractive index as that of the substrate. In this way, the micro-lenses can be made of a same material as that of the substrate, or can be made of an ultraviolet curing adhesive or a photoresist, similar to the material of the substrate.

In the privacy protection film manufactured by the method herein, when the lights exiting from the backlight source illuminate the reflective layer of the privacy protection film, the lights exiting from the backlight source are in a Lambertian distribution. After a light exiting from the backlight source enters the substrate through a light transmission hole of the layer, under the refraction of the substrate, the light beams exiting from the backlight source will be concentrated to a small three-dimensional cone angle in a corresponding area inside the substrate, and exit from the light exiting surface of the substrate at the three-dimensional cone angle. Then, for the light beams exiting from the light exiting surface of the substrate, each micro-lens provided on the light exiting surface of the substrate is configured to control the light paths, so that the light exiting directions of the light beams exiting from the light exiting surface of the substrate remain unchanged, or, the light exiting directions from the light exiting surface of the substrate are deflected toward the direction of the axis of the corresponding micro-lens. It can ensure that the light beams exiting from the backlight source exit at the three-dimensional cone angle after passing through the privacy protection film and keep a relatively small exiting angle, so that it can effectively limit the viewing angle of the display device where the privacy protection film is disposed, so that the privacy protection of the display device in all directions.

Moreover, the privacy protection film manufactured by the method herein can use the reflective layer provided on the light incident surface of the substrate to reflect light beams of the backlight source which do not enter the light transmission holes, back to the interior of the backlight source, so that this part of light beams can be emitted to the light transmission holes again after being scattered, refracted, or reflected by other optical components in the backlight module. In this way, the utilization rate of the lights emitted by the backlight source can be improved, and the intensity of the light exiting from the backlight module where the privacy protection film is disposed is also improved, so that a high-brightness display of the display device is realized.

Figure 6:
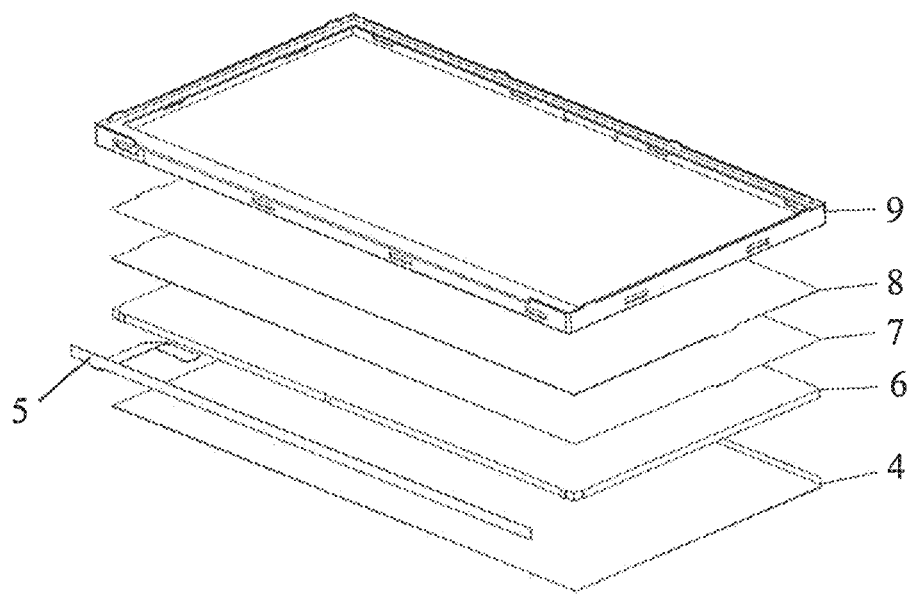
FIG. 6 is a schematically structural diagram illustrating a backlight module according to an embodiment of the present disclosure.

An embodiment of the present disclosure also provides a backlight module. The backlight module includes a backlight source, a light guide plate, and various optical films including the privacy protection film described above. The backlight source, the light guide plate, and the optical films can have a designed structure relationship. Exemplarily, as shown in FIG. 6, the backlight module includes a backlight source 5, a reflective sheet 4, a light guide plate 6, a diffusion sheet 7, a privacy protection film 8, and a sealant frame 9. The backlight source 5 is disposed on a lateral side of the light guide plate 6. The reflective sheet 4 is disposed on the light incident surface side of the light guide plate 6, the diffusion sheet 7 and the privacy protection film 8 are sequentially disposed on the light exiting surface side of the light guide plate 6, and the sealant frame 9 surrounds the reflective sheet 4, the light guide plate 6, the diffusion sheet 7, and the privacy protection film 8 to seal the gaps between the optical elements. The privacy protection film in the backlight module according to the embodiment of the present disclosure has the same advantages as the privacy protection film in the above embodiments, which will not be repeated here.

Figure 7:
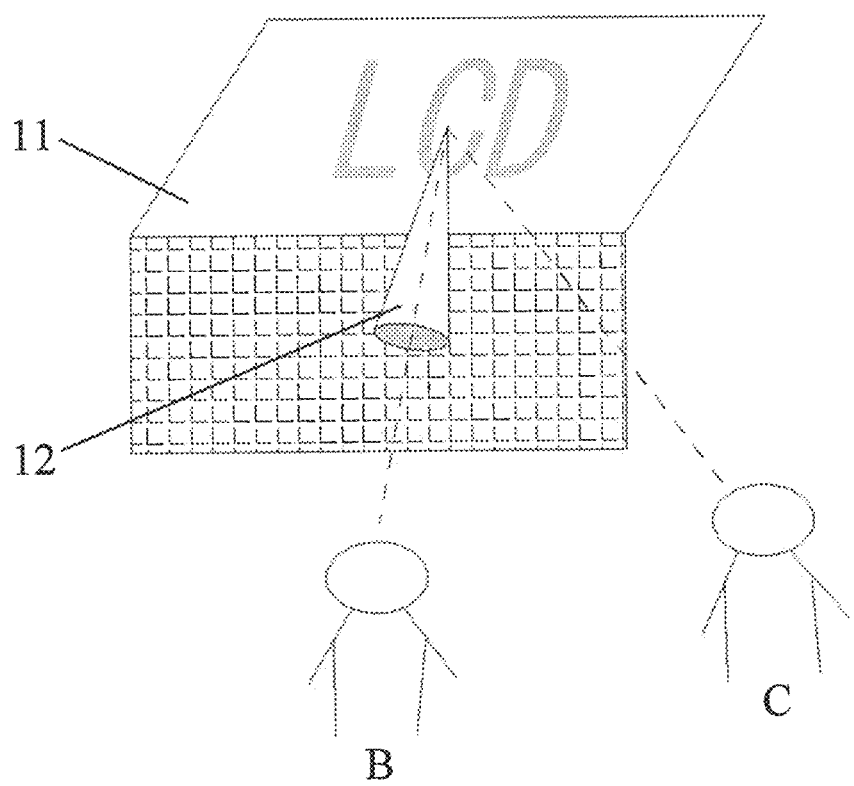
FIG. 7 is a schematic diagram illustrating privacy protection of a display device according to an embodiment of the present disclosure.

An embodiment of the present disclosure also provides a display device, which includes the backlight module provided in the above embodiment. The backlight module in the display device according to the embodiment of the present disclosure has the same advantages as the backlight module in the above embodiment. Exemplarily, as shown in FIG. 7, in the display device 11 provided in the embodiment, the light beams exiting from the backlight module are emitted at a three-dimensional cone angle, and the exiting angle is kept small, so that the display device 11 can display content at a viewing angle 12 as shown in FIG. 7. In this way, except for the user B who is directly opposite the display device 11, other people C around the user B cannot see the display content of the display device 11, so as to achieve privacy protection of the display device in all directions.

The display device provided in the above embodiment can be any product or component having a display function, such as a mobile phone, a tablet computer, a television, a display, a notebook computer, a digital photo frame, or a navigator.

The following statements should be noted:

(1) The accompanying drawings involve only the structure(s) in connection with the embodiment(s) of the present disclosure, and other structure(s) can be referred to common design(s).

(2) For the purpose of clarity only, in the accompanying drawings for illustrating the embodiment(s) of the present disclosure, the thickness of a layer or a region may be enlarged or reduced, that is, the figures are not drawn according to the actual scale.

(3) Without conflicting with each other, the embodiments of the present disclosure and elements in the embodiments can be combined to obtain new embodiments, and these new embodiments shall fall within the scope of the present disclosure.

The description above is only exemplary embodiments of the present disclosure, and the scope of the present disclosure is not limited thereto. Any changes or substitutions readily conceived by one of ordinary skill in the art without departing the technical scope of the present embodiments, shall fall within the scope of the present disclosure.

What is claimed is:

1. A privacy protection film comprising,
a substrate,
wherein a light incident surface of the substrate is provided with a reflective layer;
light transmission holes are provided on the reflective layer;
a light exiting surface of the substrate is provided with a micro-lens array;
each of the light transmission holes corresponds to at least one micro-lens in the micro-lens array;
each micro-lens is configured to control an exiting direction of light exiting from the light exiting surface of the substrate to remain unchanged; or, each micro-lens is configured to control an exiting direction of the light exiting from the light exiting surface of the substrate to be deflected toward a direction of an axis of the micro-lens;
in the micro-lens array, a distance p between axes of two adjacent micro-lenses satisfies $$p \geq 2t(n^2-1)^{\frac{1}{2}},$$

where n is a refractive index of the substrate, and t is a thickness of the substrate;
a convexity correlation factor k of the micro-lens satisfies $$k = \frac{h}{(t/\cos\theta)} \text{ and } 1 \leq k \leq 1 + \frac{1}{n},$$

where θ is a total reflection angle of the substrate and $$\theta = \arcsin\left(\frac{1}{n}\right),$$

h is a distance from a vertex of the each micro-lens to the reflective layer; and a viewing angle of the privacy protection film is inversely proportional to the convex correlation factor k of the micro-lens.

2. The privacy protection film according to claim 1, wherein the light transmission holes comprise circular holes or polygonal holes;
a distance p' between centers of two adjacent light transmission holes is equal to a distance p between axes of two adjacent micro-lenses; and the axes of the micro-lenses are perpendicular to the light incident surface of the substrate and pass through the corresponding centers of the light transmission holes.

3. The privacy protection film according to claim 2, wherein
a viewing angle correlation factor A of the privacy protection film satisfies $$A = \frac{d}{p'},$$

where d is a diameter of each light transmission hole; and the viewing angle of the privacy protection film is proportional to the viewing angle correlation factor A.

4. The privacy protection film according to claim 3, wherein a material of the substrate comprises polyethylene terephthalate or polycarbonate;
a material of the micro-lens is the same as that of the substrate; or,
a material of the micro-lens comprises an ultraviolet curing adhesive or a photoresist.

5. The privacy protection film according to claim 2, wherein a material of the substrate comprises polyethylene terephthalate or polycarbonate;
a material of the micro-lens is the same as that of the substrate; or,
a material of the micro-lens comprises an ultraviolet curing adhesive or a photoresist.

6. The privacy protection film according to claim 1, wherein
the micro-lens array has a shape of a hexagon, a square, or a rectangle; and
each micro-lens has a shape of a spherical corona or an ellipsoidal corona.

7. The privacy protection film according to claim 1, wherein a material of the substrate comprises polyethylene terephthalate or polycarbonate;
a material of the micro-lens is the same as that of the substrate; or,
a material of the micro-lens comprises an ultraviolet curing adhesive or a photoresist.

8. A method of manufacturing the privacy protection film according to claim 1, comprising:
providing a substrate;
forming a reflective layer on the light incident surface of the substrate, and forming light transmission holes on the reflective layer;
forming a micro-lens array on the light exiting surface of the substrate, so that each of the light transmission holes corresponds to at least one micro-lens in the micro-lens array;
wherein each micro-lens is configured to control the exiting direction of the light exiting from the light exiting surface of the substrate to remain unchanged; or, each micro-lens is configured to control the exiting direction of the light exiting from the light exiting surface of the substrate to be deflected toward the direction of the axis of the micro-lens.

9. The privacy protection film according to claim 1, wherein the light transmission holes comprise circular holes or polygonal holes;
a distance p' between centers of two adjacent light transmission holes is equal to a distance p between axes of two adjacent micro-lenses; and the axes of the micro-lenses are perpendicular to the light incident surface of the substrate and pass through the corresponding centers of the light transmission holes.

10. The privacy protection film according to claim 1, wherein the light transmission holes comprise circular holes or polygonal holes;
a distance p' between centers of two adjacent light transmission holes is equal to a distance p between axes of two adjacent micro-lenses; and the axes of the micro-lenses are perpendicular to the light incident surface of the substrate and pass through the corresponding centers of the light transmission holes.

11. The privacy protection film according to claim 10, wherein
a viewing angle correlation factor A of the privacy protection film satisfies $$A = \frac{d}{p'},$$

where d is a diameter of each light transmission hole; and the viewing angle of the privacy protection film is proportional to the viewing angle correlation factor A.

12. The privacy protection film according to claim 11, wherein
the micro-lens array has a shape of a hexagon, a square, or a rectangle; and
each micro-lens has a shape of a spherical corona or an ellipsoidal corona.

13. The privacy protection film according to claim 12, wherein a material of the substrate comprises polyethylene terephthalate or polycarbonate;
a material of the micro-lens is the same as that of the substrate; or,
a material of the micro-lens comprises an ultraviolet curing adhesive or a photoresist.

14. The privacy protection film according to claim 1, wherein a material of the substrate comprises polyethylene terephthalate or polycarbonate;
a material of the micro-lens is the same as that of the substrate; or,
a material of the micro-lens comprises an ultraviolet curing adhesive or a photoresist.

15. The privacy protection film according to claim 1, wherein a material of the substrate comprises polyethylene terephthalate or polycarbonate;
a material of the micro-lens is the same as that of the substrate; or,
a material of the micro-lens comprises an ultraviolet curing adhesive or a photoresist.

16. A backlight module, comprising a privacy protection film, wherein the privacy protection film comprises:
a substrate,
wherein a light incident surface of the substrate is provided with a reflective layer;
light transmission holes are provided on the reflective layer;

a light exiting surface of the substrate is provided with a micro-lens array;

each of the light transmission holes corresponds to at least one micro-lens in the micro-lens array;

each micro-lens is configured to control an exiting direction of light exiting from the light exiting surface of the substrate to remain unchanged; or, each micro-lens is configured to control an exiting direction of the light exiting from the light exiting surface of the substrate to be deflected toward a direction of an axis of the micro-lens;

in the micro-lens array, a distance p between axes of two adjacent micro-lenses satisfies $$p \geq 2t(n^2 - 1)^{\frac{1}{2}},$$

where n is a refractive index of the substrate, and t is a thickness of the substrate;

a convexity correlation factor k of the micro-lens satisfies $$k = \frac{h}{(t/\cos\theta)} \text{ and } 1 \leq k \leq 1 + \frac{1}{n},$$

where θ is a total reflection angle of the substrate and $$\theta = \arcsin\left(\frac{1}{n}\right),$$

h is a distance from a vertex of the each micro-lens to the reflective layer; and a viewing angle of the privacy protection film is inversely proportional to the convex correlation factor k of the micro-lens.

17. A display device, comprising a backlight module, wherein the backlight module comprises: a privacy protection film, wherein the privacy protection film comprises:

a substrate, wherein a light incident surface of the substrate is provided with a reflective layer;

light transmission holes are provided on the reflective layer;

a light exiting surface of the substrate is provided with a micro-lens array;

each of the light transmission holes corresponds to at least one micro-lens in the micro-lens array;

each micro-lens is configured to control an exiting direction of light exiting from the light exiting surface of the substrate to remain unchanged; or, each micro-lens is configured to control an exiting direction of the light exiting from the light exiting surface of the substrate to be deflected toward a direction of an axis of the micro-lens;

in the micro-lens array, a distance p between axes of two adjacent micro-lenses satisfies $$p \geq 2t(n^2 - 1)^{\frac{1}{2}},$$

where n is a refractive index of the substrate, and t is a thickness of the substrate;

a convexity correlation factor k of the micro-lens satisfies $$k = \frac{h}{(t/\cos\theta)} \text{ and } 1 \leq k \leq 1 + \frac{1}{n},$$

where θ is a total refection angle of the substrate and $$\theta = \arcsin\left(\frac{1}{n}\right),$$

h is a distance from a vertex of the each micro-lens to the reflective layer; and a viewing angle of the privacy protection film is inversely proportional to the convex correlation factor k of the micro-lens.

\* \* \* \* \*